United States Patent
Kalman et al.

(10) Patent No.: US 7,116,083 B2
(45) Date of Patent: Oct. 3, 2006

(54) METHOD AND SYSTEM FOR PROVIDING CURRENT LIMITING CONTROLLERS FOR HIGH REACTANCE PERMANENT MAGNET GENERATORS

(75) Inventors: Gabor Kalman, Palos Verdes, CA (US); Colin E. Huggett, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 609 days.

(21) Appl. No.: 10/350,105

(22) Filed: Jan. 24, 2003

(65) Prior Publication Data

US 2004/0145356 A1 Jul. 29, 2004

(51) Int. Cl.
*H02P 9/10* (2006.01)

(52) U.S. Cl. .............. 322/59; 322/44; 322/28; 322/17; 322/45; 322/97

(58) Field of Classification Search .......... 322/59, 322/44, 28, 17, 45, 36; 22/97
See application file for complete search history.

(56) References Cited

U.S. PATENT DOCUMENTS

| | | | |
|---|---|---|---|
| 4,100,596 A | 7/1978 | Olafson | |
| 4,103,325 A | 7/1978 | Hyman | |
| 4,937,723 A | 6/1990 | Rozman | |
| 5,013,995 A | 5/1991 | Rashid | |
| 5,493,200 A | 2/1996 | Rozman | |
| 5,508,601 A | 4/1996 | Good | |
| 5,801,516 A * | 9/1998 | Rice et al. | 322/37 |
| 5,850,138 A * | 12/1998 | Adams et al. | 362/68 |
| 6,014,015 A | 1/2000 | Thorne et al. | 322/15 |
| 6,188,203 B1 | 2/2001 | Rice | |
| 6,628,104 B1 * | 9/2003 | Yao et al. | 322/59 |
| 6,741,067 B1 * | 5/2004 | Taniguchi et al. | 322/28 |
| 2002/0110007 A1 | 8/2002 | Kalman et al. | 363/35 |
| 2004/0074804 A1 | 4/2004 | Toba et al. | 206/524.8 |

* cited by examiner

*Primary Examiner*—Nicholas Ponomarenko
*Assistant Examiner*—Iraj Mohandesi
(74) *Attorney, Agent, or Firm*—Oral Caglar, Esq.

(57) ABSTRACT

A system and method is provided for overload and fault current protection of a permanent magnet generator. The system comprises a permanent magnet machine, a DC link, an inverter, coupled between the permanent magnet machine and the DC link, and a controller adapted to provide a linear decrease in voltage for the DC link when the permanent magnet machine is in at least one of an overload and fault current condition.

17 Claims, 6 Drawing Sheets

METHOD AND SYSTEM FOR PROVIDING CURRENT LIMITING CONTROLLERS FOR HIGH REACTANCE PERMANENT MAGNET GENERATORS

CROSS REFERENCES TO RELATED APPLICATIONS

Related subject matter is disclosed in a U.S. patent application of Kalman et al. entitled, "Permanent Magnet Generator and Generator Control", Ser. No. 09/746,437, filed on Dec. 21, 2000, the entire contents of which being incorporated herein by reference.

FIELD OF THE INVENTION

The present invention relates generally to electrical machines. Specifically, the invention relates to a method and system for providing overload protection and fault current coordination for a high reactance permanent magnet generator.

BACKGROUND OF THE INVENTION

Many airplanes have high-speed electrical generators that are used for generating power during flight. The electrical generators generate AC power, which is converted to DC power. The DC power is then supplied through a DC distribution system to on-board electronics such as radar, vapor cycle compressors, flight control electronics, electromechanical/electro-hydrostatic actuators, and the like. The electrical generators can be wound field synchronous machines, switched reluctance machines, permanent magnet machines, or other types of machines.

Conventional wound field generators can provide short circuit protection. However, conventional wound field generators are incompatible with high-speed prime movers unless a gear reduction stage is added. Unfortunately, the gear reduction stage adds cost and complexity to the airplane design.

For high-speed applications, the permanent magnet machine is desirable because of its robust rotor design and a low magnetic spring rate associated with its large air gap. However, the permanent magnet generator's excitation is fixed which does not provide for a "graceful survival" of short circuit conditions.

For example, because of their low impedance, short circuit currents in excess of the permanent magnet generator's current rating can flow, causing excessive heat build up in the generator's stator windings. A short at the terminals of the machine, or at the DC link can literally melt the windings and destroy the generator. Thus, if a generator cannot survive the short circuit conditions, the generator cannot recover and deliver power to the aircraft when the short circuit is removed.

There is a need for a high-speed permanent magnet generator that can gracefully survive short circuit conditions.

SUMMARY OF THE INVENTION

An object of the present invention is to provide a high reactance permanent magnet generator (HRPMG) that when combined with appropriate power electronics and control system enables the HRPMG to provide power to the electrical distribution system during both normal and abnormal operation.

Another object of the current invention is to minimize the total KVA rating of all the power handling components of the system, and to enable the power generation system to sustain short circuit conditions within these KVA limitations.

Still another object of the present invention is to provide a linear decrease in voltage for the HRPMG during an overload period.

These and other objects are substantially achieved by providing a system and method for providing overload and fault current protection to a permanent magnet generator. The system comprises a permanent magnet machine, a DC link, an inverter, coupled between the permanent magnet machine and the DC link, and a controller adapted to provide a linear decrease in voltage for the DC link when the permanent magnet machine is in at least one of an overload and fault current condition.

BRIEF DESCRIPTION OF DRAWINGS

The details of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
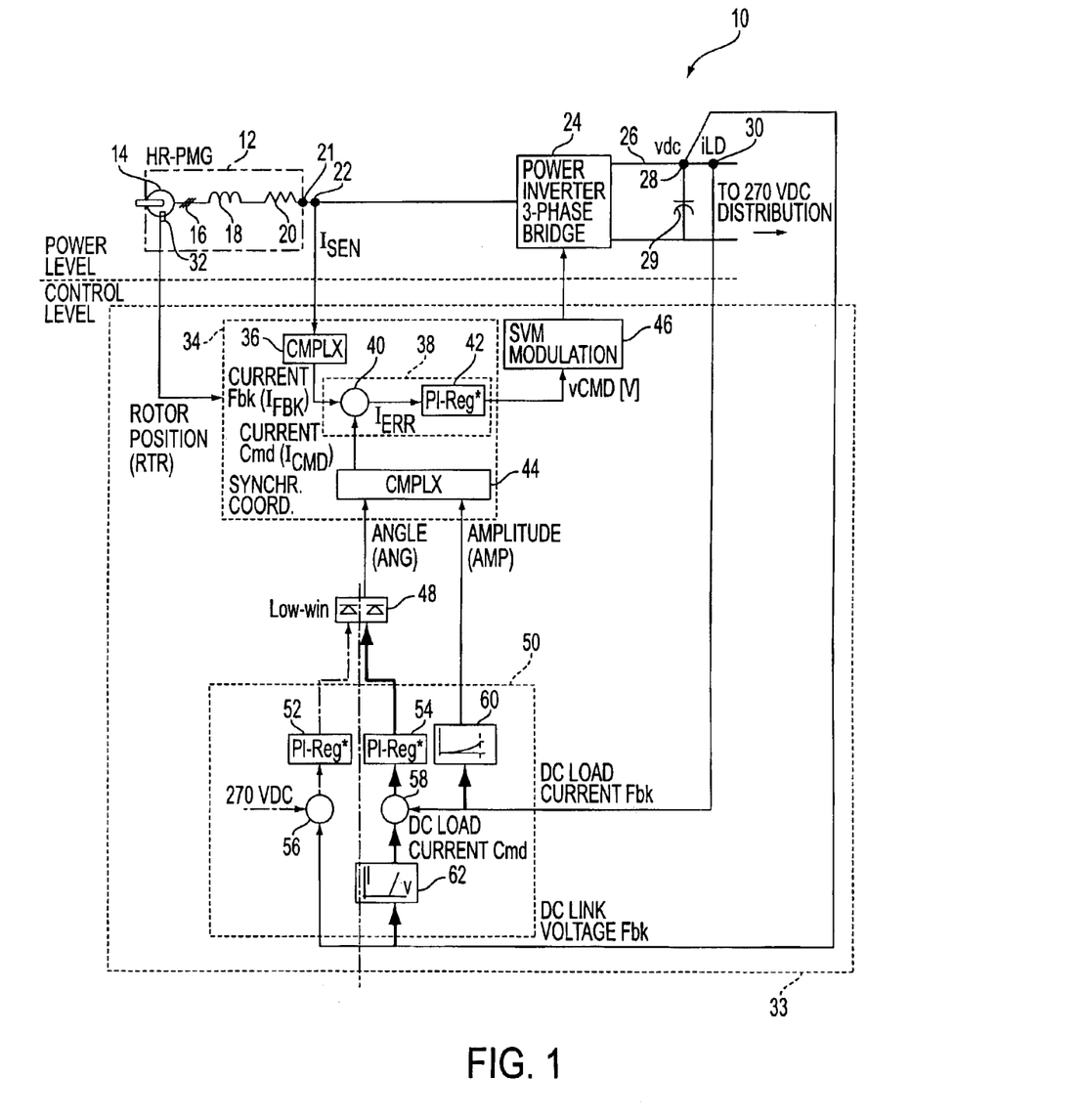
FIG. 1 is a block diagram illustrating an example of a current limiting controller for a permanent magnet generator in accordance with an embodiment of the present invention.

FIG. 1 is a block diagram illustrating an example of a current limiting system 10 for a permanent magnet generator 12 in accordance with an embodiment of the present invention. The system 10 comprises the permanent magnet electrical generator 12, which is preferably a high reactance permanent magnet generator (HRPMG) with a rotor 14, three phase stator windings 16, with associated inductance and resistance represented as an inductance 18, and a resistance 20. PMG terminals 21, AC current sensors 22, a power inverter 24, a DC link 26, a DC link voltage sensor 28, a DC link capacitor 29, a DC load current sensor 30, and a rotor position sensor 32. The system 10 also comprises a current limiting controller 33 which further includes an inner current loop operating in the synchronous reference frame of the machine rotor 34, a first complex block 36, an inner current loop block 38, a first summing junction 40, a first proportional integral (PI) regulator 42, a second complex box 44, a space vector modulation (SVM) logic block 46, a low wins block 48, an outer loop block 50 including a second PI regulator 52, a third PI regulator 54, a second summing junction 56, a third summing junction 58, a first non-linear function generator 60, and a second non-linear function generator 62.

The power inverter 24 is disposed between the PMG terminals 21 and the DC link 26. The power inverter 24 is preferably a three-phase bridge inverter and includes six switches: a set of upper switches (not shown) and a set of lower switches (not shown). Each switch of the power inverter 24 includes a controllable solid-state device (not shown) (e.g., an IGBT, a MOSFET, and the like) and an anti parallel diode (not shown) across the solid-state device. The DC link capacitor 29 is coupled across the DC link 26 to provide a low source impedance for the power inverter 24, and to reduce voltage ripples on the DC link 26.

It should be appreciated by those skilled in the art that although the system 10 is described in connection with three-phase AC power, it is not so limited. For instance, the system 10 can utilize two-phase AC power.

The DC link 26 is connected to the DC link voltage sensor 28 and to the DC load current sensor 30. The power inverter 24 provides an output voltage, vdc, to the DC link voltage sensor 28 and a load current, iLD, to the DC load current sensor 30. When a load is applied to the distribution system, the reduction in the output voltage of the power inverter 28, causes the control system to extract energy from the HRPMG in order to return the DC link voltage to its regulated value. When a short circuit is applied to the DC link, the current in the machine is limited only by the machine internal impedance, shown as a lumped parameter inductance 18, and resistance 20.

The three phase stator windings 16 include inductance 18 and resistance 20. The three phase currents are sensed by the machine current sensors 22, and the individual currents are combined to form a Park Vector or space vector in block 36, which is then transferred to the synchronous reference frame based on the position sensor 32. The rotor position sensor 32 is coupled to the rotor 14 and provides rotor position information to the vector co-ordinate transformation block 34. Specifically, the co-ordinate transformation block 34 transforms the current vector in stationary co-ordinates, represented by sinusoidally varying time displaced currents, into a current vector in the synchronous reference frame where the currents are basically DC values.

Figure 2:
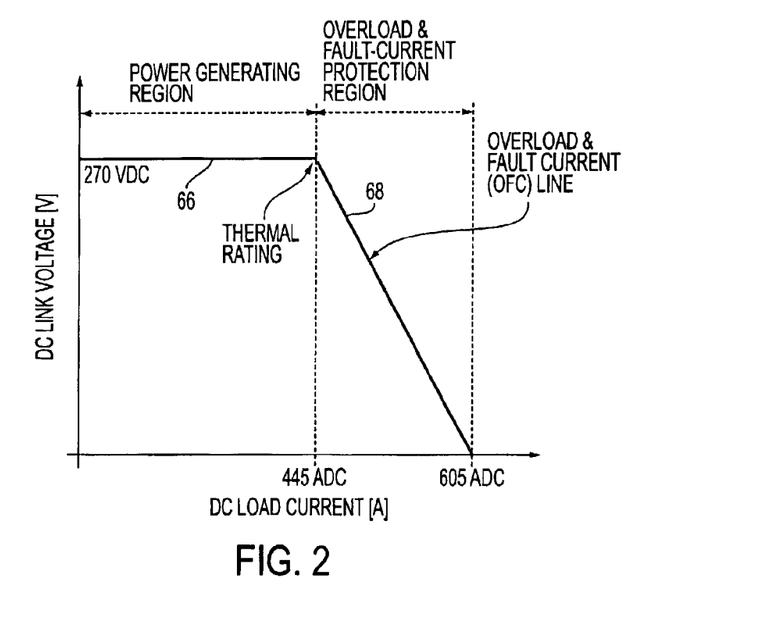
FIG. 2 shows a graph for providing overload and fault current (OFC) protection in accordance with an embodiment of the present invention.

The voltage generated from the three phase stator windings 16 of the generator 12 also known as the "back emf" will be referred to as the generator voltage or generator emf. The voltage at the terminals of the power inverter 24 will be referred to as the inverter terminal voltage. Reference is now made to FIG. 2 which shows a graph for providing overload and fault current (OFC) protection in accordance with an embodiment of the present invention. The y-axis and x-axis of the graph 64 describe the DC link voltage in volts and the DC load current in amps, respectively. When the power generation system is regulating the output voltage at its rated value, 270 VDC, as the load is increased upon the distribution system, the voltage is maintained at its regulated value. Once the output power reaches the rated KVA of the system, the output voltage is reduced, but the current is maintained at an essentially constant value. In this way, the power generation system can supply overload and short circuit current to the distribution system without exceeding its KVA rating.

Referring to FIG. 1, the DC link voltage sensor 28 and DC load current sensor 30 provide a DC link voltage feedback signal and a DC load current feedback signal, respectively, to the outer loop block 50. The DC link voltage and DC load current feedback signals contain the measured voltage for the DC link 26 and the measured current for the load. When a load is coupled to the DC link 26, current is provided to the load. The system 10 insures that the appropriate voltage is provided to the load. If there is a short circuit on the DC link 26 or an overload condition, the PMG 12 needs to be protected. Thus, the system 10 provides overload and short circuit protection for the PMG 12.

Specifically, there are two paths from the outer loop 50 to the inner current loop in synchronous co-ordinate system. In path one, the DC load current sensor 30 provides the DC load current feedback message to the first nonlinear function generator 60 which converts the DC load current feedback signal to a signal AMP representing an equivalent AC current peak value, which is used as a machine current amplitude reference. The calculation of AMP is disclosed in U.S. Patent Application Publication No. US 2002/0110007 A1.

Path two is further divided into two sub-paths. In the first sub-path, the DC link voltage sensor 28 provides the DC link voltage feedback signal to the second nonlinear function generator 62 which converts the DC link voltage feedback signal to a DC load current command signal. The DC load current command signal specifies the desired load current for the DC link 26. The third summing junction 58 determines a first error signal which is the difference between the desired DC load current and the measured DC load current. The first error signal is provided to the third PI regulator 54. The third PI regulator 54 provides an ANG signal to the low-win block 48. The ANG signal is the angle component for the first error signal.

In the second sub-path, the second summing junction 56 determines a second error signal, which is the difference between the DC link voltage feedback signal and a 270 volt DC reference signal. The second error signal is provided to the second PI regulator 52 which processes the received signal to provide an ANG signal to the low-win block 48. The low-win block 48 monitors the signals received from the second and third PI regulators 52 and 54. When the signal from the third PI regulator 54 is lower than the signal from the second PI regulator, the low win circuit 48 will output a command equal to the output of the PI regulator 54. When the output of PI regulator 52 is lower than the output of PI regulator 54, the output of the low wins circuit 48 is the output of PI regulator 52.

The rotor position sensor 32 generates a rotor position signal RTR which indicates the angle of the rotor 14 relative to the center of the "A" phase winding of the stator. The rotor position sensor 32 is aligned such that the unit vector $e^{(jRTR)}$ is in phase with the PMG 12 voltage vector $V_{EMF}$. The rotor position signal RTR provides the position reference for the PMG's 12 EMF. AC current sensors 22 generate signals $I_{SEN}$ indicating current sensed at the PMG terminals 21.

The first complex block 36 combines the sensed current signals $I_{SEN}$ to form a current Park vector in the stationary reference frame, which is then transformed to the synchronous reference frame with respect to the rotor 14 using the unit vector $e^{(-jRTR)}$. The current feedback vector $I_{FBK}$ so formed is supplied to the inner loop 38.

Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain where time is a parameter. A voltage Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984), which is incorporated herein by reference.

The current Park vector may be converted from a stationary frame to a synchronous frame by extracting a unit amplitude Park vector, $e^{jRTR}$, from the rotor position signal RTR (e.g., by computing the function cos(RTR)+jsin(RTR)) and taking the product of the current Park vector and a complex conjugate, $e^{-jRTR}$, of the unit amplitude Park vector. The synchronous current Park vector $I_{FBK}$ is synchronous with respect to the rotor 14. The unit amplitude Park vector is represented by a complex number in polar coordinates or as a+ib in Cartesian coordinates from which the complex conjugate, $e^{-jRTR}$, of the unit amplitude Park vector is determined.

The second complex block 44 combines the amplitude magnitude signal AMP and the load angle signal ANG to produce a vector-based current command, e.g., $AMPe^{-jANG}$, from the signals ANG and AMP indicating load angle and amplitude. Thus, the load angle signal ANG provides the angle-portion of the vector-based current-command, and the current peak value represents the amplitude portion of the vector-based current command. An output of the second block 48 supplies the current command $I_{CMD}$ so formed to the inner loop 38.

The inner loop 38 includes a first summing junction 40, which subtracts the feedback current vectors $I_{FBK}$ from the current command $I_{CMD}$ to produce an error vector $I_{ERR}$. The vector-based PI regulator 42, which is preferably a current regulator, with appropriate amplitude limits, converts the error vector $I_{ERR}$ into a voltage vector command $V_{CMD}$ in the synchronous reference frame. This voltage vector is then transformed back to the stationary reference frame by multiplication by $e^{jRTR}$. The voltage vector command $V_{CMD}$ represents the voltage amplitude and the load angle of the inverter's 24 terminal voltage and provides appropriate AC voltage at the PMG terminals 21. The amplitude limits are established by the inverter duty cycle range for the desired DC link voltage.

By controlling both the current amplitude, AMP, and the associated command angle, ANG, the PMG's 12 current can be minimized for any applied load on the DC link 26. In other words, the AMP and ANG signals are adjusted with respect to the EMF of the PMG 12.

The SVM logic 46 converts the voltage vector command $V_{CMD}$ back into a stationary reference frame, e.g., by taking a product of the voltage command $V_{CMD}$ and the unit amplitude Park vector $e^{jRTR}$, and uses space vector modulation to turn the switches of the inverter 24 on and off. The switches of the inverter 24 are modulated at a high frequency, e.g., 40 kHz in order to minimize the size of the DC link capacitor 29.

It should be appreciated by those skilled in the art that the PI regulators 40, 52 and 54 are application specific. The regulator values are preferably dependent upon desired responses to the power inverter 24, DC link voltages and other system constraints and inputs.

Figure 3:
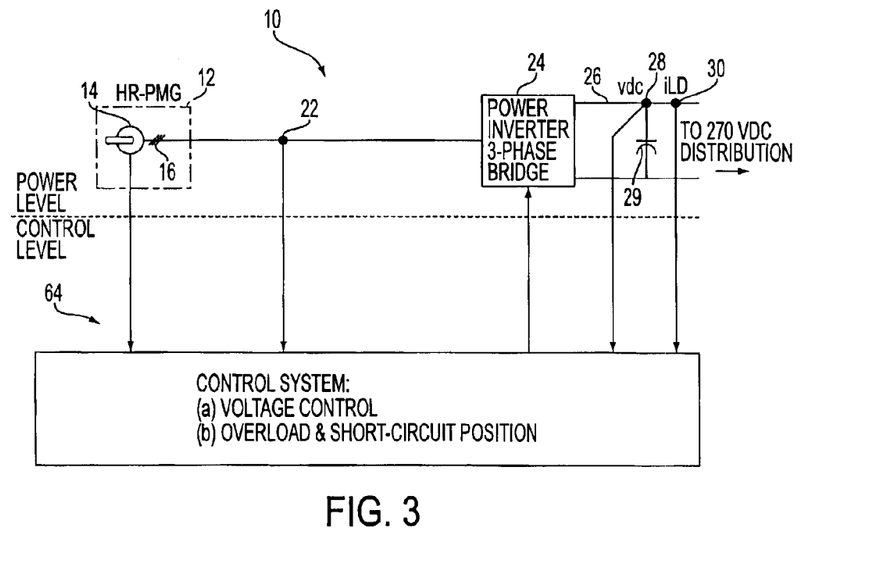
FIG. 3 is a simplified block diagram illustrating an example of a current limiting controller for a permanent magnet generator in accordance with an embodiment of the present invention.

FIG. 3 is a simplified block diagram illustrating an example of a current limiting controller for the permanent magnet generator 12 in accordance with an embodiment of the present invention. Specifically, FIG. 3 is a simplified block diagram of FIG. 1. The control system 64 provides voltage control and overload protection for the PMG 12. The control system 64 interacts with the power inverter 24 to control the DC link voltage.

Figure 4A:
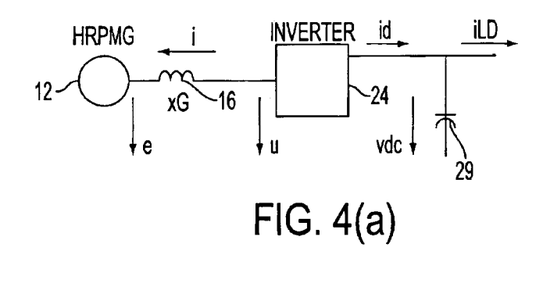
FIGS. 4A through 4E together show phasor relationships among first, second and third operating points in accordance with an embodiment of the present invention.

FIGS. 4A through 4E together show phasor relationships among first, second and third operating points in accordance with an embodiment of the present invention. FIG. 4A depicts a portion of the system 10 including the PMG 12, windings 16, inverter 24, DC link 26, and capacitor 29 with reference to the directions of currents and voltages on the DC and the AC side of the inverter 24. The AC side of the circuit is located between the PMG 12 and the inverter 24. The DC side of the circuit is located on the DC link 26 side of the inverter of FIG. 4A. The PMG's 12 current, terminal voltage and EMF represented by phasors i, u, and e, respectively are disposed on the AC side of the circuit. The DC current, DC voltage and DC current load represented by id, vdc and iLD, respectively are disposed on the DC side of the circuit of FIG. 4A.

Figure 4B:
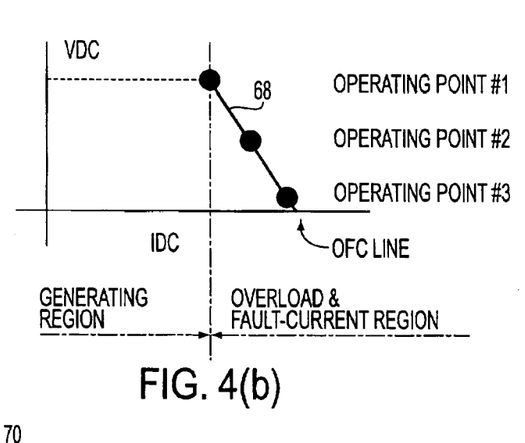

FIG. 4B shows the overload and fault current line 68 of FIG. 2 having operating points 1, 2 and 3. Operating points 1, 2 and 3 represent the 100%, 50%, and 0% DC link 26 voltage conditions. In other words, in the overload and fault current region of FIG. 4B, the load voltage is reduced so that it preferably follows OFC line 68. Rather than going from 100% to 0% almost instantaneously, the voltage is reduced gradually, providing a graceful degradation.

Figure 4C:
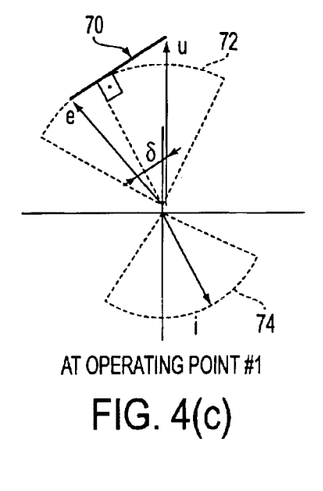

FIG. 4C shows a phasor diagram when the system 10 is at operating point 1. The reactive drop of the PMG 12, i.xG, represented by plot 70 is constant. The locus also known as the "path followed by" of the EMF is also constant and is represented by arc 72. The locus of the current, i represented by arc 74 is also constant. The locus of the PMG's 12 current, i, is a circle since along the OFC line 68 the system 10 preferably requires a constant current amplitude equal to the PMG's 12 short circuit current. The angle δ changes for the different operating points since the reactive drop remains constant.

Figure 4D:
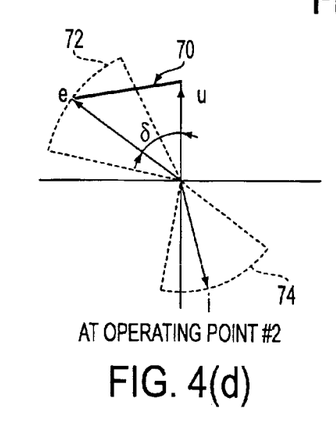

FIG. 4D shows a phasor diagram when the system 10 is at operating point 2. The DC link voltage is reduced 50%. In response, the PMG's 12 terminal voltage, u, also decreases while the angle δ increases.

Figure 4E:
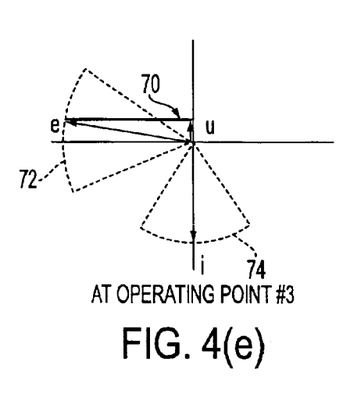

FIG. 4E shows a phasor diagram when the system 10 is at operating point 3. The DC link voltage is at or near zero and the PMG's 12 terminal voltage, u, has decreased further from that shown in FIG. 4D. In comparing FIGS. 4D through 4E, it can be seen that with respect to the EMF vector e, at 100% DC link voltage the current vector has substantially a direct axis content. However, at or near 0% DC link voltage, the current vector primarily has quadrature axis currents as shown in FIG. 4E.

FIGS. 5A through 5H are graphs showing transient responses of the current limiting controller to increasing loads in accordance with an embodiment of the present invention. The graphs show that the requirements of FIG. 2 with reference to the OFC line 68 have been met.

Figure 5A:
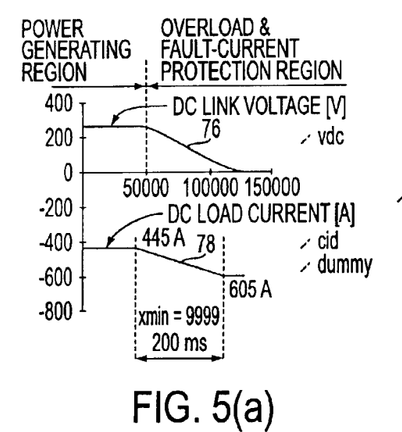
FIGS. 5A through 5H are graphs showing transient responses of the current limiting controller to increasing loads in accordance with an embodiment of the present invention.

In FIG. 5A, plot 76 shows that the DC link voltage decreases linearly when the system 10 is in an overload and fault current condition. Similarly, plot 78 shows that the current increases linearly when the system 10 is in an overload and fault current condition.

Figure 5B:
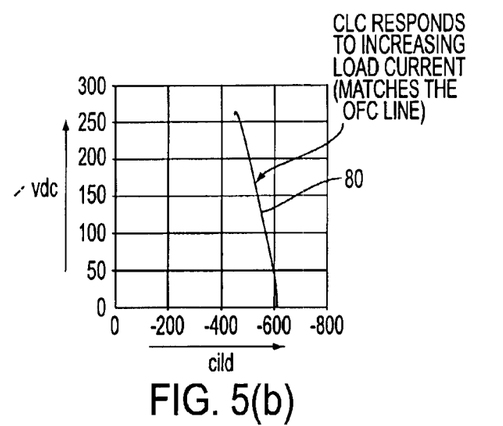
Figure 5C:
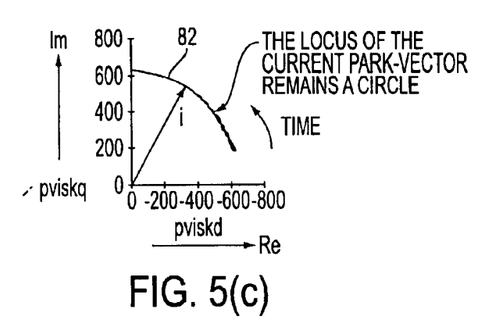
Figure 5D:
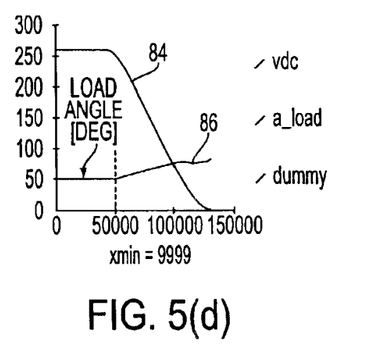

The plot 80 in FIG. 5B illustrates how the system responds to an increasing load current by substantially matching the OFC line 68. In FIG. 5C plot 82, illustrates that the locus of the generator current remains a circle while the currents direct and quadrature components change. In FIG. 5D plots 84 and 86, illustrate that to maintain a constant current amplitude the load angle preferably increases as the DC link voltage decreases.

Figure 5E:
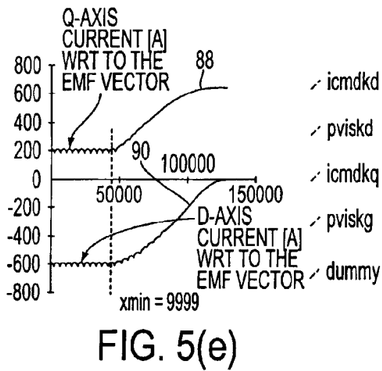
Figure 5F:
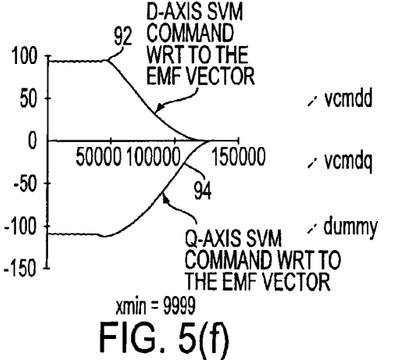

In FIG. 5E plots 88 and 90 and in FIG. 5F plots 92 and 94 illustrate how the direct and quadrature axis currents and SVM voltage command components vary.

Figure 5G:
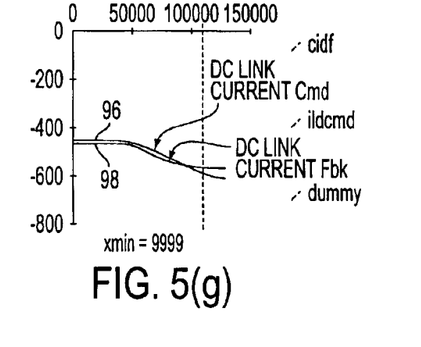

In FIG. 5G plots 96 and 98 illustrate how the system responds to the decreasing DC link voltage by increasing the DC link current.

Figure 5H:
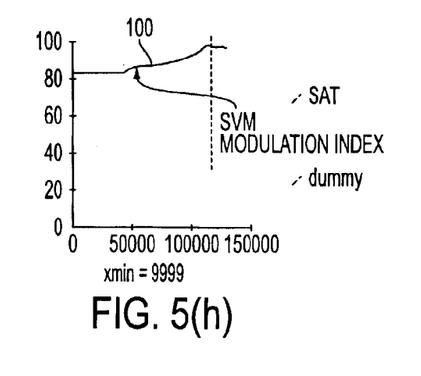

In FIG. 5H plot 100 illustrates that the modulation of the SVM 46 limits the DC link current that the system 10 provides when the modulation index is saturated.

Figure 6:
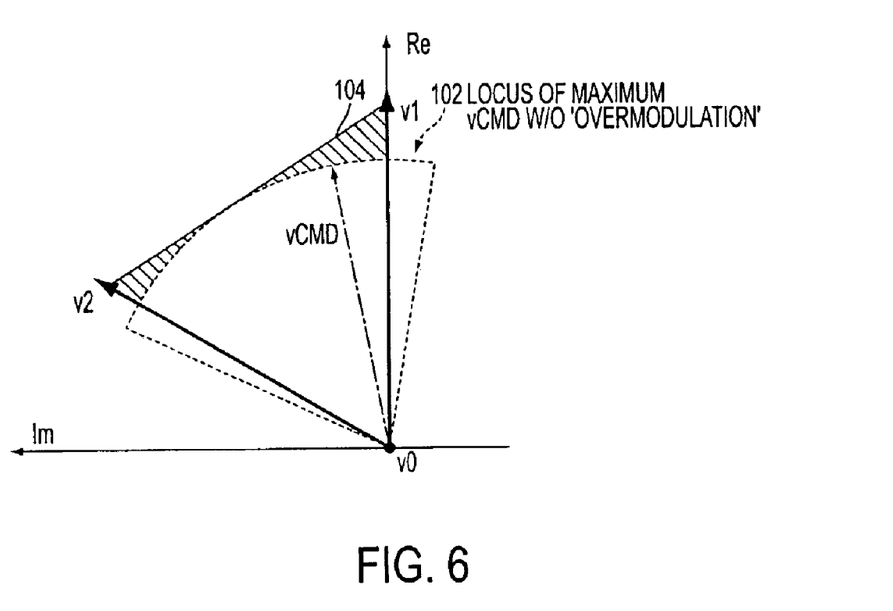
FIG. 6 is a graph showing an over-modulation condition for the current limiting controller in accordance with an embodiment of the present invention.

FIG. 6 is a graph showing an over-modulation condition for the current limiting controller in accordance with an embodiment of the present invention. Specifically, FIG. 6 shows over-modulation for the SVM logic block 46. In order to control the current voltage curve from the full power to the short circuit condition, the SVM logic block 46 preferably goes into an over-modulation mode. The over-modulation mode is preferably nonlinear.

FIG. 6 also illustrates a single 60-degree portion of the SVM logic block's 46 complex plane. The vectors v1 and v2 represent two out of six possible, nonzero inverter voltage park vectors. The command voltage vector is preferably a linear combination of the v1, v2 and v0 vectors. To avoid saturation of the $v_{CMD}$ signal, the locus of the $v_{CMD}$ amplitude is limited to preferably a 0.577×VDC value. Over-modulation suppresses v0. Thus an extra 15% SVM logic block 46 voltage can be obtained by increasing the maximum $V_{CMD}$ value from 0.577×VDC to 0.666×VDC.

Typically, control systems operate within area 102 which is the locus of maximum vCMD without over-modulation. However, control system 10 operates within area 104 which is the locus of maximum vCMD with over-modulation in order to control line 68 in FIG. 2A. This allows the control system 10 to utilize the full capability of the inverter 24.

Thus, disclosed is a permanent magnet generator 12 that can gracefully survive short circuit conditions. Such a permanent magnet generator 12 and control system 10 can be used to generate DC power in aircraft. Further, short circuit currents can be supplied by such a system without exceeding the rated current for the permanent magnet generator 12 and the inverter 24.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A system comprising:
    a permanent magnet machine;
    a DC link;
    an inverter, coupled between said permanent machine and said DC link; and
    a controller adapted to provide a linear decrease in voltage for said DC link when said permanent magnet machine is in at least one of an overload and fault current condition wherein the controller regulates a DC voltage by adjusting a load angle and magnitude of an AC terminal voltage of said inverter with respect to an electromagnetic force for the permanent magnet machine.

2. The system of claim 1, wherein said permanent magnet machine comprises a high reactance permanent magnet machine.

3. The system of claim 1, wherein said permanent magnet machine is thermally rated up to 270 volts DC and up to 445 amps DC.

4. The system of claim 1, wherein said overload and fault current conditions occur when a load current is between 445 and 605 amps DC.

5. The system of claim 1, wherein said controller controls the DC link voltage as a function of current when at least one of said overload and fault current conditions exist.

6. The system of claim 1, wherein the load angle is taken as the angle between a Park vector representing machine emf and a Park vector representing the ac terminal voltage.

7. The system of claim 1, wherein the controller provides a vector based current command signal as a function of the load angle and a permanent magnet machine reference signal.

8. The system of claim 7, wherein the controller provides a feedback current vector signal representing a detected current flowing through stator windings of the permanent magnet machine and the current vector signal and the current command signal being synchronous with respect to a rotor angle of the permanent magnet machine.

9. The system of claim 8, wherein the controller provides a voltage command signal to modulate the inverter, the voltage command signal being derived from the vector-based current command signal and the feedback current vector signal.

10. The system of claim 9, wherein said controller modulates the inverter using space vector modulation.

11. A method of providing overload and fault current protection to a permanent magnet machine generator, the method comprising:
    determining a load angle from a measured DC link voltage and a reference DC link voltage;
    providing a reference current signal from said load angle;
    detecting a measured current from an AC generator;
    providing a reference voltage signal from said reference current signal; and
    modulating an inverter with said reference voltage signal to provide a linear decrease in current of said DC link when said permanent magnet machine is in one of at least an overload and fault current condition.

12. The method of claim 11, wherein the permanent magnet machine comprises a high reactance permanent magnet machine.

13. The method of claim 11, wherein the reference current signal is synchronous with respect to an electromagnetic force (EMF) of the permanent magnet machine.

14. The method of claim 11, wherein the measured current of the AC generator is synchronous with respect to an electromagnetic force (EMF) of the permanent magnet machine.

15. The method of claim 11, wherein said permanent magnet machine is thermally rated up to 270 volts DC and up to 445 amps DC.

16. The method of claim 11, wherein an overload and fault current condition occur when a load current is between 445 and 605 amps DC.

17. The method of claim 11, wherein the inverter is modulated using space vector modulation.

* * * * *